United States Patent
Burdon (10) Patent No.: US 10,573,858 B2
(45) Date of Patent: *Feb. 25, 2020

(54) WEARABLE BATTERY STORAGE APPARATUS AND SYSTEM WITH REPLACEABLE BATTERY CARTRIDGE

(71) Applicant: Ron Burdon, Peru, IL (US)

(72) Inventor: Ron Burdon, Peru, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/954,096

(22) Filed: Apr. 16, 2018

(65) Prior Publication Data

US 2019/0181397 A1    Jun. 13, 2019

Related U.S. Application Data

(63) Continuation-in-part of application No. 15/840,060, filed on Dec. 13, 2017, now Pat. No. 10,490,784.

(51) Int. Cl.
| | |
|---|---|
| *H01M 2/10* | (2006.01) |
| *H01M 2/04* | (2006.01) |
| *H04R 25/00* | (2006.01) |

(52) U.S. Cl.
CPC .......... *H01M 2/1005* (2013.01); *H01M 2/04* (2013.01); *H01M 2/1016* (2013.01); *H01M 2/1038* (2013.01); *H04R 25/602* (2013.01)

(58) Field of Classification Search
CPC ... A45F 5/00; H01M 2220/30; H01M 2/1005; A44C 5/14; G04B 37/1486
USPC ........ 224/196, 219, 245, 902, 267, 164–180
See application file for complete search history.

(56) References Cited

U.S. PATENT DOCUMENTS

| | | | | |
|---|---|---|---|---|
| 4,483,626 A | * | 11/1984 | Noble | G04B 19/264 368/10 |
| 4,785,981 A | * | 11/1988 | Rodman | A44C 5/003 224/165 |
| 5,229,220 A | | 7/1993 | Stanton et al. | |
| 5,505,354 A | * | 4/1996 | Hutton | A01K 97/06 206/315.11 |
| 5,915,558 A | * | 6/1999 | Girvetz | A61J 7/0481 206/534 |
| 6,464,389 B1 | | 10/2002 | Ghoorahoo | |
| 8,006,860 B2 | * | 8/2011 | Klein | B65D 77/044 206/800 |
| 2004/0069674 A1 | * | 4/2004 | Siegel | B65D 75/327 206/538 |
| 2014/0117060 A1 | * | 5/2014 | Colone | A44C 5/003 224/219 |

(Continued)

*Primary Examiner* — Nathan J Newhouse
*Assistant Examiner* — Matthew T Theis
(74) *Attorney, Agent, or Firm* — Armstrong Teasdale LLP (57) ABSTRACT

A wearable battery storage apparatus including a removable and replaceable battery cartridge are described herein. The wearable battery storage apparatus includes a battery storage component and a band coupled to the battery storage component. The battery storage component includes a storage portion defining a chamber, and a lid coupled to the storage portion. The battery storage component includes the cartridge removably retained in the chamber. The cartridge defines a plurality of slots therein, each of the plurality of slots sized to receive and retain a battery therein. The lid is configured to selectively transition the battery storage component between an open configuration and a closed configuration.

11 Claims, 5 Drawing Sheets

(56) References Cited

U.S. PATENT DOCUMENTS

2015/0189956 A1\* 7/2015 Rivera ................. A44C 5/0007
224/152

\* cited by examiner

WEARABLE BATTERY STORAGE APPARATUS AND SYSTEM WITH REPLACEABLE BATTERY CARTRIDGE

CROSS-REFERENCE TO RELATED APPLICATIONS

This application is continuation-in-part of U.S. patent application Ser. No. 15/840,060, filed Dec. 13, 2017, the entire contents of which are hereby incorporated by reference herein.

BACKGROUND OF THE DISCLOSURE

The present disclosure relates generally to battery storage and, more particularly, to a wearable battery storage apparatus and system including the same. In particular embodiments, the present disclosure is directed to a wearable hearing aid storage apparatus and system with a removable and replaceable battery cartridge.

Hearing aids are typically powered by very small batteries, which are often mere millimeters in diameter. Commonly, these batteries are a zinc-air disposable battery, which are sealed with a sticker or other removable, air-tight film. Once the film is removed from the battery, oxygen interacts with the zinc in the battery to activate the battery for use. Once the battery is activated, it typically cannot be "de-activated." The life of these batteries varies, but is typically only a matter of days (e.g., 3-20 days).

Accordingly, users of hearing aids must frequently replace the battery in their hearing aid(s). Users may need to carry packages of batteries with them or may have multiple packages of batteries in various locations throughout their home, car, work, etc. In some cases, users may find themselves without a package of batteries when the battery in their hearing aid expires, which can be inconvenient or even dangerous.

Therefore, it would be advantageous to provide an apparatus and method that can provide more convenient hearing aid battery storage and transport.

BRIEF SUMMARY OF THE DISCLOSURE

In one aspect, a wearable battery storage apparatus is provided. The wearable battery storage apparatus includes a battery storage component and a band coupled to the battery storage component. The battery storage component includes a storage portion defining a chamber, and a lid coupled to the storage portion. The battery storage component also includes a cartridge removably retained in the chamber. The cartridge defines a plurality of slots therein, each of the plurality of slots sized to receive and retain a battery therein. The lid is configured to selectively transition the battery storage component between an open configuration and a closed configuration.

In another aspect, a cartridge for a wearable battery storage apparatus is provided. The cartridge includes a top wall, a bottom wall opposite the top wall, and a plurality of side walls. The top wall, bottom wall, and plurality of side walls define an outer profile of the cartridge. The cartridge further includes a plurality of slots defined in the top wall of the cartridge, each of the plurality of slots sized to receive and retain a battery therein. The outer profile of the cartridge is complementary to a shape of a chamber in the wearable battery storage apparatus.

In another aspect, a wearable battery storage apparatus is provided. The wearable battery storage apparatus includes a battery storage component and a band coupled to the battery storage component. The battery storage component includes a storage portion defining a chamber, and a lid coupled to the storage portion. The storage portion includes a cartridge removably retained in the chamber, the cartridge defining a plurality of slots therein, each of the plurality of slots sized to receive and retain a battery therein. The lid is configured to selectively transition the battery storage component between an open configuration and a closed configuration. The wearable battery storage apparatus further includes a plurality of batteries, each battery retained in a respective one of the plurality of slots.

In yet another aspect, a battery storage system is provided. The battery storage system includes a wearable battery storage apparatus including a battery storage component and a band coupled to the battery storage component. The battery storage component includes a storage portion defining a chamber, and a lid coupled to the storage portion. The storage portion includes a cartridge removably retained in the chamber, the cartridge defining a plurality of slots therein, each of the plurality of slots sized to receive and retain a battery therein. The lid is configured to selectively transition the battery storage component between an open configuration and a closed configuration. The battery storage system also includes a package of batteries, including a plurality of blister modules, each blister module containing a respective battery therein. The plurality of slots are arranged complementary to the plurality of blister modules.

BRIEF DESCRIPTION OF THE DRAWINGS

Reference is now made more particularly to the drawings, which illustrate the best presently known mode of carrying out the disclosure and wherein similar reference characters indicate the same parts throughout the views.

DETAILED DESCRIPTION OF THE DISCLOSURE

In the following detailed description numerous specific details are set forth in order to provide a thorough understanding of the disclosure. However, it will be understood by those skilled in the art that the present disclosure may be practiced without these specific details. For example, the disclosure is not limited in scope to the particular type of industry application depicted in the figures. In other instances, well-known methods, procedures, and components have not been described in detail so as not to obscure the present disclosure.

The present disclosure is directed generally to wearable devices that provide battery storage, and particularly hearing aid battery storage. In many embodiments, the wearable storage devices allow a user easy, consistent, and reliable access to a hearing aid battery at any time. The wearable storage apparatus described herein is safe and easy to use, and provides an end user a convenient method for storing and using hearing aid batteries. The wearable storage devices improve the quality of life for many individuals by consolidating hearing aid batteries to a single source.

Figure 1:
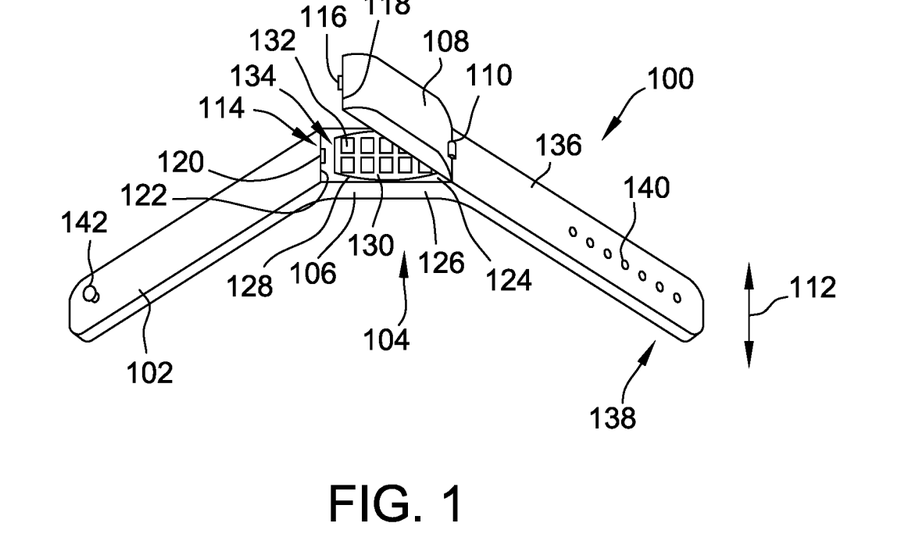
FIG. 1 is a top perspective view of a first example embodiment of a wearable battery storage apparatus.

FIG. 1 is a top perspective view of a first example embodiment of a wearable battery storage apparatus 100. The wearable battery storage apparatus 100 is configured for wear by a user (not shown), such as about a wrist, hand, and/or arm of the user. In other embodiments, a user could wear the wearable battery storage apparatus around his/her neck. The wearable battery storage apparatus 100 broadly includes a band 102 coupled to a battery storage component 104. As described further herein, the battery storage component 104 may be at least partially removable and/or replaceable. The battery storage component 104 is configured to retain one or more hearing aid batteries, and/or any other battery having a relatively small form factor (e.g., batteries with a diameter less than about 2 cm, or less than about 1.5 cm, or less than about 1.0 cm, or even less than about 0.8 cm). It should be readily understood that the wearable battery storage apparatus 100 may include additional or alternative components such that the wearable battery storage apparatus 100 is wearable on other parts of a user's body, such as an ankle, or coupleable to a user's clothing. In the illustrated embodiment of FIG. 1, the battery storage component 104 and the band 102 are formed as a single, unitary piece, such as by molding or any other forming process, although multiple pieces are within the scope of the present disclosure.

As shown in FIG. 1, the battery storage component 104 includes a storage portion 106 and a lid 108 coupled thereto. The lid 108 is configured to selectively transition the battery storage component 104 between an open configuration (i.e., when the lid is open, as shown in FIG. 1) and a closed configuration (i.e., when the lid is closed, not specifically shown). In the illustrated embodiment, the lid 108 is hingedly coupled to the storage portion 106 about a hinge 110 directed generally parallel to a lateral axis or widthwise direction 112 of the wearable battery storage apparatus 100. The battery storage component 104 further includes a closure mechanism 114 for permitting the user to selectively close the lid 108 (and, thereby, close the battery storage component 104). In one example embodiment, the closure mechanism 114 is easily manipulatable such that a user with limited motor control may open the lid 108. In the illustrated embodiment, the closure mechanism 114 includes a latch mechanism, including a latch tab 116 positioned on an edge 118 of the lid 108 opposite the hinge 110, and a groove 120 configured to receive the latch tab 116 therein, with a snap-fit connection. The groove 120 is defined in the battery storage component 104, specifically along an edge 122 of the storage portion 106. In any alternative embodiment, the groove 120 may be defined in the band 102. The closure mechanism 114 may include any other mechanism, such as an alternative snap closure, hook-and-loop fasteners, a magnet closure, etc.

In the illustrated embodiment, the storage portion 106 generally includes a top face 124, a bottom face (not specifically shown in FIG. 1) generally parallel to the top face 124, and two side faces 126 generally perpendicular to the top face 124. The storage portion 106 defines a chamber 128 extending from the top face 124 towards the bottom face, the chamber 128 having an insert or cartridge 130 received therein. The cartridge 130 defines a plurality of slots 132 therein, each of the slots 132 generally sized and oriented to receive one battery (not shown in FIG. 1) therein. In the illustrated embodiment, the plurality of slots 132 are arranged in two parallel rows 134. Put another way, the plurality of slots 132 are arranged complementary to an arrangement of batteries originally contained in a blister pack (not shown). Accordingly, in the example embodiment, the batteries may be discharged from the blister pack directly into the plurality of the slots 132. As such, it should be readily understood that the plurality of slots 132 may be arranged in any suitable manner that is complementary to one or more battery blister packs. Such an arrangement allows a user to conveniently transition batteries directly from a blister pack to the wearable storage apparatus.

Figure 7:
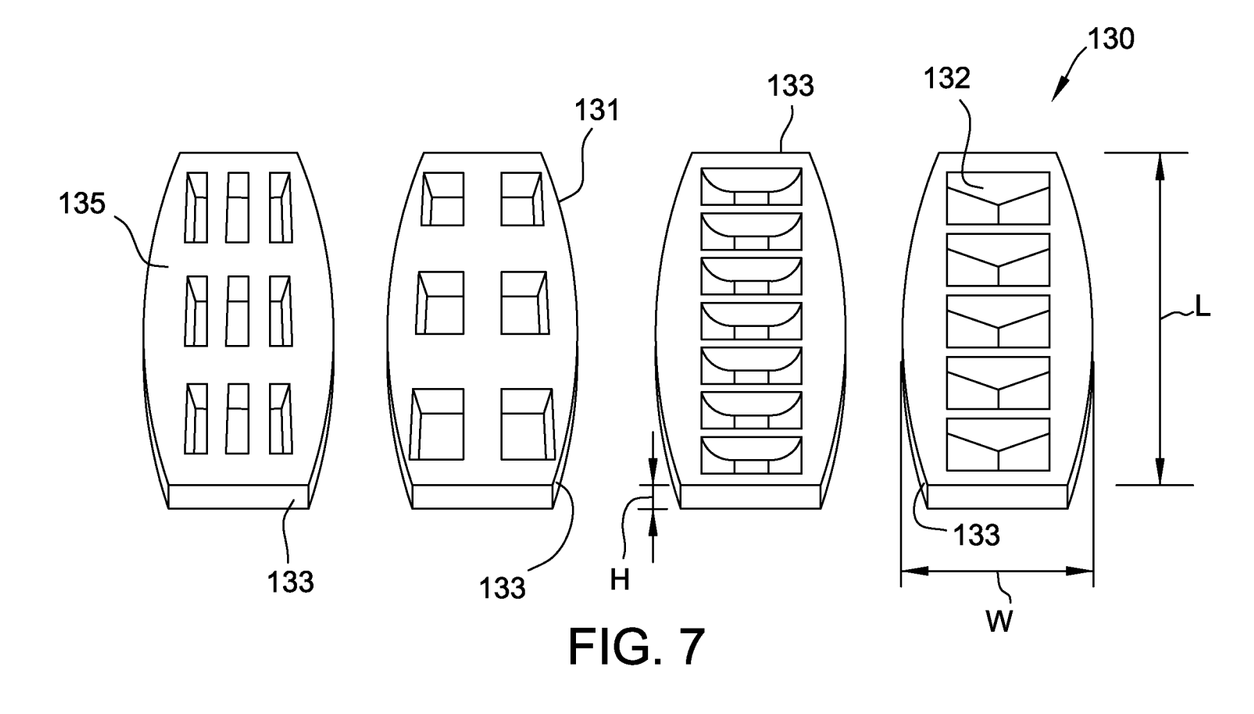
FIG. 7 is a top perspective view of a plurality of embodiments of a removable and replaceable battery storage cartridge that may be with the wearable battery storage apparatus shown in any of FIGS. 1-6.

In the example embodiment, the wearable battery storage apparatus 100 is sized, shaped, and configured to facilitate removal and/or replacement of the cartridge 130 in the chamber 128 of the storage portion 106. With reference to FIGS. 1 and 7, a plurality of cartridges 130 with varying layouts of the plurality of slots 132 are able to be received within chamber 128. Accordingly, a single wearable battery storage apparatus 100 may accommodate cartridges 130 that hold varying numbers, sizes, and/or layouts of batteries. The cartridges 130 are illustrated without batteries therein, however, it should be readily understood that the cartridges 130 may be "pre-stocked" with a battery in each slot 132, such that a user need not "self-stock" the cartridge 130 with batteries. In such embodiments, the user need only insert the cartridge 130 into the chamber 128.

In the example embodiment, the chamber 128 is sized and configured to receive cartridges 130 having a predetermined outer profile 131. The outer profile 131 of the cartridges 130 is defined by a shape, size, and/or orientation of a plurality of walls of the cartridges 130, specifically a plurality of side walls 133, a top wall 135, and a bottom wall (not specifically shown) opposite the top wall 135. The outer profile 131 may include a predetermined length L, width W, and/or height H.

In the example embodiment, the outer profile 131 of each cartridge 130 for use with the wearable battery storage apparatus 100 is defined such that, when the cartridge 130 is inserted into the chamber 128, the top wall 135 of the cartridge is 130 is substantially co-planer with the top face 124 of the storage portion 106. In addition, with reference to FIGS. 7 and 8, the side walls 133 are complementary to a shape 129 of the chamber 128 such that the cartridge 130 is frictionally retained in the chamber 128.

Figure 8:
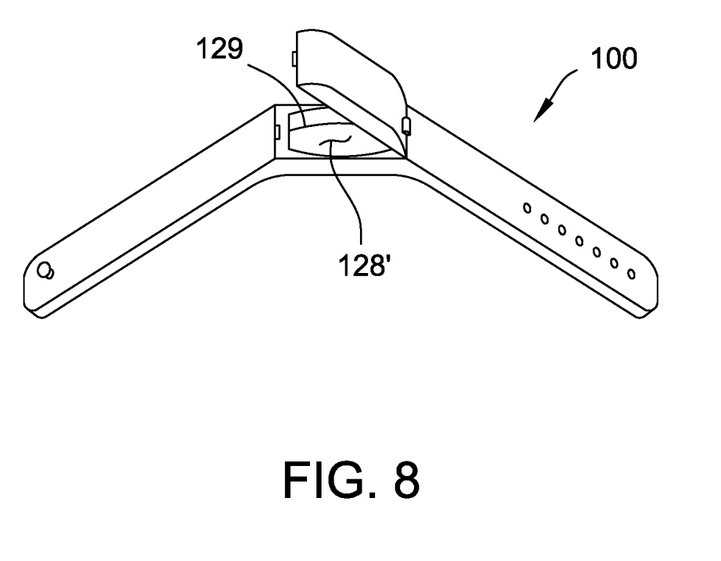
FIG. 8 is a top perspective view the wearable battery storage apparatus shown in FIG. 1 with a battery cartridge removed therefrom.

In the example embodiment, the battery storage component 104, specifically the storage portion 106, is flexible and/or malleable such that the storage portion 106 can be bent, twisted, or otherwise deformed to discharge or de-couple one battery from its corresponding slot 132. Accordingly, any of the faces of the storage portion 106 may be formed as a thin panel to accommodate such deformation. Moreover, the battery storage component 104, specifically the storage portion 106, is flexible and/or malleable such that the storage portion 106 can be bent, twisted, or otherwise deformed to discharge or de-couple the cartridge 130 from the chamber 128, for removal and subsequent replacement with another cartridge 130 (e.g., a cartridge 130 with batteries in each of the slots 132). FIG. 8 illustrates an embodiment of the wearable battery storage apparatus 100 with an empty chamber 128'. The empty chamber 128' may receive a full cartridge 130 therein.

In addition, the cartridge 130 may formed of a foam material, such that the cartridge 130 is flexible enough to accommodate such deformation of the storage portion 106. In addition, the cartridge 130 is formed of a material having a suitable malleability such that the cartridge 130 fixedly retains the batteries therein. The cartridge 130 may be formed of any other suitable material in any alternative embodiment. In many embodiments, silicone and silicone-based materials may be suitable.

The band 102 includes two opposing arms 136, each arm 136 extending from the battery storage component 104. The band 102 may be formed of any suitable material, such as a plastic or polymeric material, metal, fabric, wood, etc. The band 102 includes an adjustable securing mechanism 138 permitting adjustment of a length or size of the band 102 about, for example, a user's wrist. In the illustrated embodiment, the adjustable securing mechanism 138 includes a plurality of consecutive holes 140 defined in one of the arms 136 and a knob 142 extending from the other arm 136. The holes 140 are sized and oriented to receive the knob 142 therein, to close the band 102 about the user's wrist. In any alternative embodiment, the band 102 may include an alternative securing mechanism 138, such as additional knobs, a buckle closure, hook-and-loop fasteners, etc. Additionally or alternatively, the band 102 may be formed, at least partially, from an elastic or semi-elastic material to further facilitate adjustability of the band 102.

Figure 2:
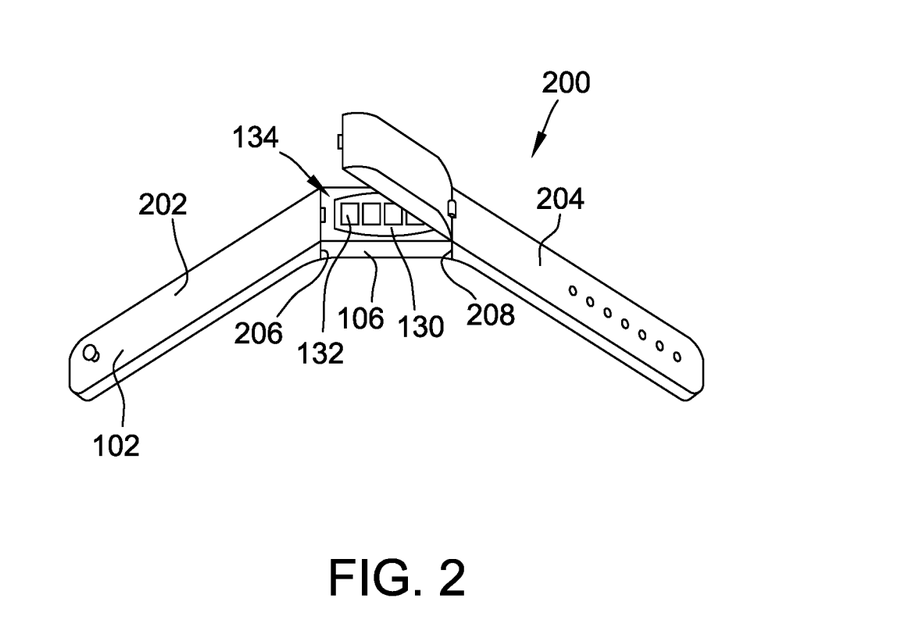
FIG. 2 is top perspective view of a second example embodiment of a wearable battery storage apparatus.

FIG. 2 is top perspective view of a second example embodiment of a wearable battery storage apparatus 200. The wearable battery storage apparatus 200 may be similar to and/or incorporate one or more features of the wearable battery storage apparatus 100 shown in FIG. 1 and, accordingly, like numbers are used to refer to like components thereof.

In the illustrated embodiment, the storage portion 106 of the battery storage component 104, and, specifically, the insert 130, includes only a single row 134 of slots 132. In addition, the slots 132 are larger such that the slots 132 may accommodate larger batteries therein. In some cases, a blister pack containing batteries (not shown) may include more than one row of blisters with batteries therein. The user may discharge only one row of batteries at a time into the storage portion 106 of the wearable battery storage apparatus 200.

In addition, in the illustrated embodiment, the band 102 is formed as a separate component coupled to the battery storage component 104. More particular, the band 102 includes two separate arms 202, 204 each coupled to an end face 206, 208 of the storage portion 106. The arms 202, 204 may be coupled to the storage portion 106 using any suitable fastener, including, for example, a magnet fastener, a snap fastener, a rail or channel type fastener, a threaded fastener, etc.

Figure 3:
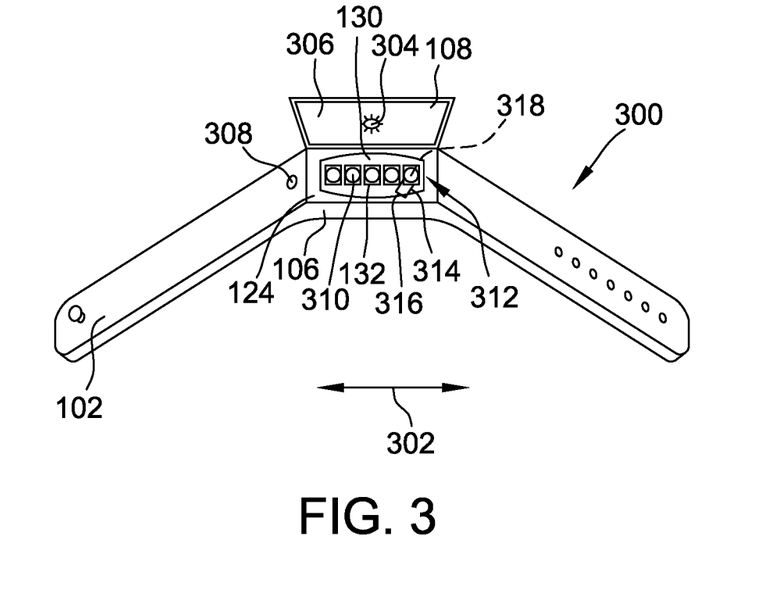
FIG. 3 is top perspective view of a third example embodiment of a wearable battery storage apparatus.

FIG. 3 is top perspective view of a third example embodiment of a wearable battery storage apparatus 300. The wearable battery storage apparatus 300 may be similar to and/or incorporate one or more features of the wearable battery storage apparatus 100 shown in FIG. 1 and/or the wearable battery storage apparatus 200 shown in FIG. 2, and, accordingly, like numbers are used to refer to like components thereof.

In the illustrated embodiment, the lid 108 is hingedly coupled to the storage portion 106 about a hinge (not specifically shown) directed generally parallel to a longitudinal axis or lengthwise direction 302 of the wearable battery storage apparatus 300. In addition, the lid 108 further includes a light 304 positioned on an interior surface 306 of the lid 108. In one example embodiment, the light 304 is activated when the lid 108 is open. The light 304 may be activated in any suitable fashion, such as automatically or in response to a command from a user. In the illustrated embodiment, the wearable battery storage apparatus 300 includes a button 308 that activates the light 304 when depressed. Although the button 308 is shown as being defined in the band 102, the button 308 may be defined on the lid 108, along the storage portion 106, and/or in any alternative location. The light 304 may include an LED light or any other suitable light. Preferably, the light 304 is a relatively low-power light that can be powered by a small form-factor battery (disposable or rechargeable) electrically coupled to the light 304 within the wearable battery storage apparatus 300. For instance, in some embodiments, the wearable battery storage apparatus 300 may include a battery (or any other power source) in the lid 108, the band 102, the storage portion 106, and/or in any suitable location.

In the illustrated embodiment, the wearable battery storage apparatus 300 is shown with batteries 310 retained therein. More specifically, the plurality of slots 132 have a corresponding plurality of batteries 310 retained therein. Moreover, the storage portion 106 includes a battery removal mechanism 312 embodied as one or more pull-tabs 314 disposed in one or more slots 132. The pull-tab 314 includes a free end 316 extending outwards past the top face 124 of the storage portion 106 when the battery 310 is retained in the slot 132, and an opposite end 318 secured within the slot 132 beneath the battery 310. A user may pull on the free end 316 of the pull-tab 314 to dislodge the battery 310 from the slot 132. The storage portion 106 may include additional and/or alternative battery removal mechanisms 312 to remove batteries 310 from the insert 130.

Figure 4:
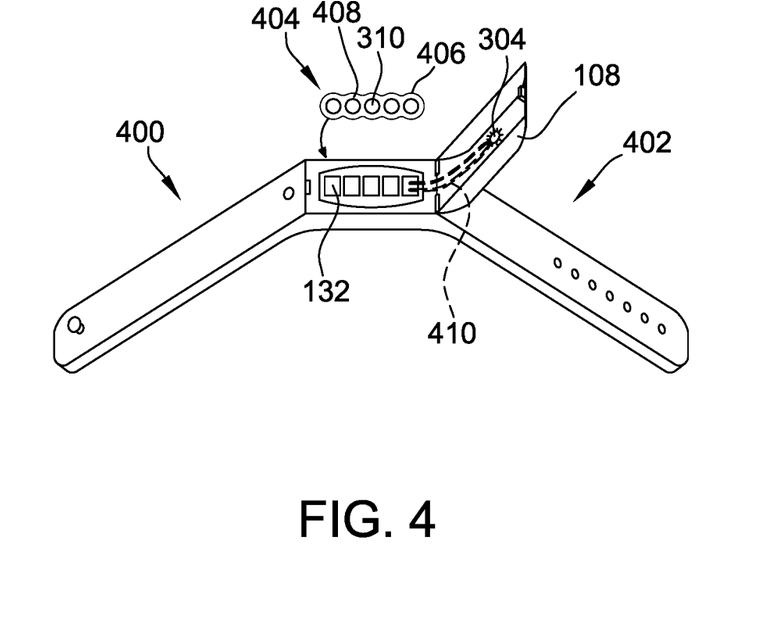
FIG. 4 is top perspective view of a wearable battery storage system including a fourth example embodiment of a wearable battery storage apparatus and a blister pack of batteries.
Figure 5:
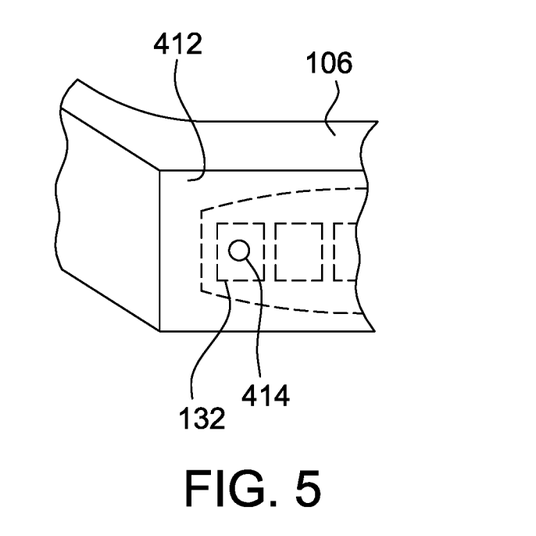
FIG. 5 is a bottom view of the wearable battery storage apparatus shown in FIG. 4.

FIG. 4 is top perspective view of a wearable battery storage system 400 including a fourth example embodiment of a wearable battery storage apparatus 402 and a package 404 or "blister pack" of batteries 310. FIG. 5 is a bottom perspective view of the wearable battery storage apparatus 402. The wearable battery storage apparatus 402 may be similar to and/or incorporate one or more features of the wearable battery storage apparatus 100 shown in FIG. 1, the wearable battery storage apparatus 200 shown in FIG. 2, and/or the wearable battery storage apparatus 300 shown in FIG. 3, and, accordingly, like numbers are used to refer to like components thereof.

The package 404 of batteries 310 includes a blister pack 406 and a plurality of batteries 310. The package 404 may further include additional packaging materials, such as a cardboard or paper backing, that are omitted from the figure for clarity. The blister pack package 404 defines a plurality of blister modules 408, each blister module 408 containing a respective battery 310 therein. As shown in FIG. 4, the plurality of slots 132 are arranged complementary to the plurality of blister modules 408, such that the batteries 310 may be discharged directly from the blister modules 408 into the slots 132.

In the illustrated embodiment, the lid 108 includes a light 304 that is powered by one of the batteries 310 retained in the storage portion 106. Accordingly, in such an embodiment, the battery storage component 104 includes internal wiring 410 extending from one of the slots 132 to the light 304, to electrically the light 304 to the battery 310 in that slot 132. In cases where the batteries 310 are zinc-oxide batteries, the user may remove a plastic film or sticker (not specifically shown) from the battery 310 before inserting the battery 310 into this slot 132, to activate the battery 310 to power the light 304. In addition, turning to FIG. 5, a bottom face 412 of the storage portion 106 may include a vent hole 414 such that oxygen may readily flow into the slot 132 to activate the battery 310 therein.

Figure 6:
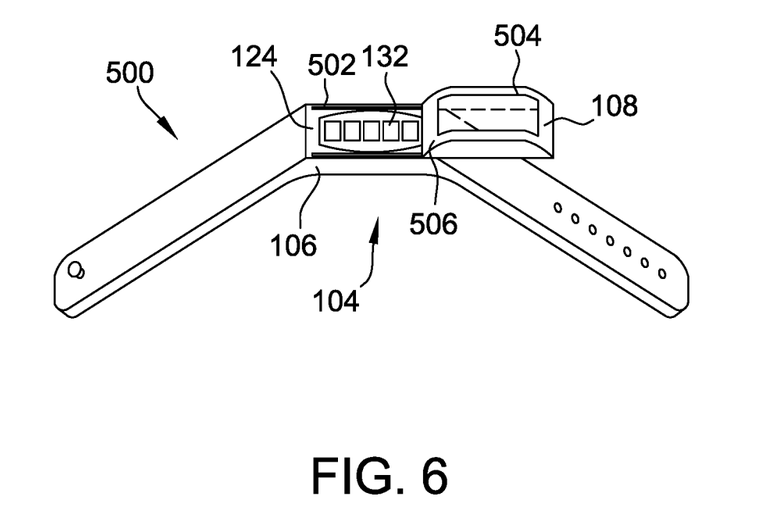
FIG. 6 is top perspective view of a fifth example embodiment of a wearable battery storage apparatus.

FIG. 6 is top perspective view of a fifth example embodiment of a wearable battery storage apparatus 500. The wearable battery storage apparatus 500 may be similar to and/or incorporate one or more features of the wearable battery storage apparatus 100 shown in FIG. 1, the wearable battery storage apparatus 200 shown in FIG. 2, the wearable battery storage apparatus 300 shown in FIG. 3, and/or the wearable battery storage apparatus 402 shown in FIGS. 4 and 5, and, accordingly, like numbers are used to refer to like components thereof.

In particular, the wearable battery storage apparatus 500 includes a lid 108 slideably coupled to the storage portion 106. The storage portion 106 includes two parallel rails 502 defined in the top face 124 thereof, and the lid 108 includes corresponding tabs (not shown) that are slidable within the rails 502 relative to the storage portion 106, to transition the lid 108 between an open and closed position.

In addition, the lid 108 includes a display 504 defined in an exterior surface 506 thereof. In the illustrated embodiment, the display 504 includes a transparent or translucent material (e.g., plastic) that forms a window into an interior of the battery storage component 104 when the lid 108 is in the closed position. In this way, a user can see how many batteries remain in the battery storage component 104 without having to open the lid 108. Additionally or alternatively, the display 504 may include an opaque screen as well as digital components configured to display information on the screen. In some embodiments, the screen may include LEDS, OLEDs, plasma, and/or any other suitable display screen. For example, the display 504 may indicate how many batteries remain in the battery storage component 104. As another example, the battery storage component 104 may include at least one force sensor that is triggered upon insertion and/or removal of a battery from a slot 132. The display 504 may be activated when only one battery remains, to indicate to the user that only one battery is left in the battery storage component 104. Additionally or alternatively, the battery storage component 104 may include a timer mechanism that is activated when a battery is removed from a slot 132 (i.e., when the force sensor is triggered). The timer mechanism may track an estimated remaining lifetime of the battery after removal (assuming the battery is activated soon after removal from the slot 132). The display 504 may be configured to indicate the estimated remaining lifetime. The display 504 may be activated using any suitable mechanism, such as a motion trigger (e.g., a turn of the wrist), a physical control (e.g., upon press of a button), etc. Moreover, the display 504 may additionally or alternatively include one or more lights (e.g., LEDs) that activate as an alert (e.g., low estimated battery life remaining).

The wearable battery storage apparatus described herein facilitates more convenient storage of small form factor batteries, such as hearing aid batteries. As such, the batteries may be more readily available to a user thereof without needing to carry or locate packages of batteries. Moreover, the wearable battery storage apparatus facilitates removal and replacement of a cartridge (i.e., removing an empty cartridge for replacement with a full cartridge). As such, a user may fill the wearable battery storage apparatus without the need for manipulation of individual batteries into the apparatus.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A wearable battery storage apparatus comprising:
    a battery storage component comprising:
        a storage portion defining a chamber;
        a cartridge removably retained in the chamber, the cartridge defining a plurality of slots therein;
        a plurality of batteries, each battery retained in a respective one of the plurality of slots, wherein the storage portion and the cartridge are flexible to accommodate simultaneous deformation of the storage portion and the cartridge to discharge a respective battery from one of the plurality of slots, and wherein the storage portion is flexible to further accommodate deformation thereof to discharge the cartridge therefrom; and
        a lid coupled to the storage portion and configured to selectively transition the battery storage component between an open configuration and a closed configuration, wherein the lid comprises a display configured to indicate to a user a number of the plurality of batteries remaining in the plurality of slots and an estimated remaining lifetime of the battery once discharged from the one of the plurality of slots; and
    a band coupled to the battery storage component.

2. The wearable battery storage apparatus of claim 1, wherein the plurality of slots are arranged in one or more rows.

3. The wearable battery storage apparatus of claim 1, wherein the cartridge comprises a top wall, a bottom wall opposite the top wall, and a plurality of side walls, the top wall, bottom wall, and plurality of side walls defining an outer profile of the cartridge.

4. The wearable battery storage apparatus of claim 3, wherein the outer profile of the cartridge is complementary to a shape of the chamber.

5. The wearable battery storage apparatus of claim 3, wherein the top wall of the cartridge is substantially co-planar with a top face of the storage portion.

6. The wearable battery storage apparatus of claim 1, wherein the lid is hingedly coupled to the storage portion.

7. The wearable battery storage apparatus of claim 1, wherein the lid is slidably coupled to the storage portion.

8. The wearable battery storage apparatus of claim 1 further comprising a light arranged on an interior surface of the lid.

9. The wearable battery storage apparatus of claim 1, wherein the band comprises two arms, each of the two arms extending from an end face of the storage portion.

10. The wearable battery storage apparatus of claim 1, wherein the band comprises an adjustable securing mechanism configured to adjustably secure the band in a closed configuration.

11. The wearable battery storage apparatus of claim 1, wherein the battery storage component further comprises a latch mechanism configured to maintain the battery storage component in the closed configuration.

\* \* \* \* \*